(12) United States Patent
Kim et al.

(10) Patent No.: US 9,936,533 B2
(45) Date of Patent: Apr. 3, 2018

(54) METHOD FOR CONTROLLING RELAY ON BASIS OF PROXIMITY SERVICE AND DEVICE THEREFOR

(71) Applicant: LG ELECTRONICS INC., Seoul (KR)

(72) Inventors: Laeyoung Kim, Seoul (KR); Taehyeon Kim, Seoul (KR); Jaehyun Kim, Seoul (KR); Jinsook Ryu, Seoul (KR); Hyunsook Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 85 days.

(21) Appl. No.: 14/903,999

(22) PCT Filed: Jul. 7, 2014

(86) PCT No.: PCT/KR2014/006055
§ 371 (c)(1),
(2) Date: Jan. 8, 2016

(87) PCT Pub. No.: WO2015/005626
PCT Pub. Date: Jan. 15, 2015

(65) Prior Publication Data
US 2016/0198516 A1 Jul. 7, 2016

Related U.S. Application Data

(60) Provisional application No. 61/843,911, filed on Jul. 9, 2013, provisional application No. 61/922,874, filed (Continued)

(51) Int. Cl.
*H04W 76/04* (2009.01)
*H04W 40/22* (2009.01)
(Continued)

(52) U.S. Cl.
CPC .......... *H04W 76/04* (2013.01); *H04L 12/189* (2013.01); *H04L 65/4076* (2013.01);
(Continued)

(58) Field of Classification Search
CPC ... H04W 76/04; H04W 76/023; H04W 40/22; H04W 88/04; H04L 65/4076
See application file for complete search history.

(56) References Cited

U.S. PATENT DOCUMENTS 8,570,945 B2 * 10/2013 Seok .................... H04W 40/22
370/328
2004/0027619 A1 * 2/2004 Sato ....................... G06Q 30/02
358/407
(Continued)

FOREIGN PATENT DOCUMENTS

| JP | 2009-27277 A | 2/2009 |
| KR | 10-2009-0089985 A | 8/2009 |

(Continued)

OTHER PUBLICATIONS

3GPP TR 22.803 V12.2.0, "Feasibility study for Proximity Services (ProSe) (Release 12)", Jun. 28, 2013 (http://www.3gpp.org/ftp/Specs/archive/22_series/22.803/22803-c20.zip), Sections 5.2.10.2-5.2.10.3.

*Primary Examiner* — Rasheed Gidado
(74) *Attorney, Agent, or Firm* — Dentons US LLP

(57) ABSTRACT

The present invention relates to a method and a device for controlling a relay of relay user equipment (UE) in a wireless communication system. Specifically, the method comprises the steps of: announcing information on whether the relay UE can be relayed; and controlling the relay by comparing updated information with reference information according to a new relay request, wherein the reference information is set to be changed on the basis of state
(Continued)

information of the relay UE and/or a packet data network (PDN) connection related to the relay.

10 Claims, 4 Drawing Sheets

Related U.S. Application Data on Jan. 2, 2014, provisional application No. 61/936,883, filed on Feb. 7, 2014, provisional application No. 61/937,582, filed on Feb. 9, 2014, provisional application No. 61/938,161, filed on Feb. 11, 2014, provisional application No. 61/982,888, filed on Apr. 23, 2014.

(51) Int. Cl.
| | | |
|---|---|---|
| *H04W 76/02* | (2009.01) | |
| *H04L 29/06* | (2006.01) | |
| *H04W 88/04* | (2009.01) | |
| *H04L 12/18* | (2006.01) | |
| *H04W 8/00* | (2009.01) | |
| *H04W 92/18* | (2009.01) | |

(52) U.S. Cl.
CPC ......... *H04W 40/22* (2013.01); *H04W 76/023* (2013.01); *H04W 88/04* (2013.01); *H04W 8/005* (2013.01); *H04W 76/022* (2013.01); *H04W 92/18* (2013.01); *Y02B 60/50* (2013.01)

(56) References Cited

U.S. PATENT DOCUMENTS

| | | | | |
|---|---|---|---|---|
| 2011/0019606 | A1* | 1/2011 | Umeda | H04W 24/02 370/315 |
| 2011/0060835 | A1* | 3/2011 | Dorso | H04L 65/1069 709/227 |
| 2011/0179167 | A1* | 7/2011 | Tanimoto | H04L 12/4625 709/225 |
| 2011/0202757 | A1* | 8/2011 | Nakagawa | G06F 21/33 713/153 |
| 2013/0083721 | A1* | 4/2013 | Wu | H04W 36/0055 370/315 |
| 2013/0294327 | A1* | 11/2013 | Horn | H04W 88/04 370/315 |
| 2014/0095717 | A1* | 4/2014 | Danforth | H04L 61/2015 709/226 |
| 2014/0141777 | A1* | 5/2014 | Guo | H04W 8/005 455/434 |
| 2014/0237036 | A1* | 8/2014 | Tanimoto | H04L 67/025 709/203 |

FOREIGN PATENT DOCUMENTS

| | | |
|---|---|---|
| KR | 10-2012-0074255 A | 7/2012 |
| WO | 2013/028044 A2 | 2/2013 |

\* cited by examiner (a)

(b)

METHOD FOR CONTROLLING RELAY ON BASIS OF PROXIMITY SERVICE AND DEVICE THEREFOR

This application is a National Stage Application of International Application No. PCT/KR2014/006055, filed on Jul. 7, 2014, which claims the benefit of U.S. Provisional Application No. 61/843,911, filed on Jul. 9, 2013; U.S. Provisional Application No. 61/922,874, filed on Jan. 2, 2014; U.S. Provisional Application No. 61/936,883, filed on Feb. 7, 2014; U.S. Provisional Application No. 61/937,582, filed on Feb. 9, 2014; U.S. Provisional Application No. 61/938,161, filed on Feb. 11, 2014; and U.S. Provisional Application No. 61/982,888, filed on Apr. 23, 2014, all of which are hereby incorporated by reference in their entirety for all purposes as if fully set forth herein.

TECHNICAL FIELD

The present invention relates to a wireless communication system and, more particularly, to a method for controlling a proximity service based relay and an apparatus therefor.

BACKGROUND ART

A Proximity Service (ProSe) refers to a scheme that supports communication between devices located physically close to each other. Specifically, ProSe is aimed to discover an application operating in devices that are in proximity to each other and ultimately to support an operation of exchanging application-related data. For example, it may be considered that ProSe is applied to applications such as Social Network Services (SNS), commerce, and games.

ProSe may also be called Device-to-Device (D2D) communication. That is, ProSe refers to a communication scheme for establishing a direct link between a plurality of devices (e.g., User Equipments (UEs)) and thus directly exchanging user data (e.g., voice or multimedia data) between the devices without passing through a network. ProSe communication may include UE-to-UE communication, peer-to-peer communication, etc. In addition, the ProSe communication scheme may be applied to Machine-to-Machine (M2M) communication, Machine Type Communication (MTC), etc. Therefore, ProSe is being considered as one solution to burden of an eNodeB due to data traffic that rapidly increases. By introducing ProSe, effects such as reduction in procedures of the eNodeB, decreases in power consumption of devices that participate in ProSe, increase in data transmission rate, increase in network accommodation capacity, load distribution, cell coverage expansion, etc. can be expected.

DISCLOSURE

Technical Field

Although the necessity of introduction of such a ProSe has been discussed, a detailed execution plan for a mechanism for supporting and controlling the ProSe has not been made.

An object of the present invention is to prevent service degradation by controlling a ProSe based relay in association with a ProSe based communication mechanism.

The technical objects that can be achieved through the present invention are not limited to what has been particularly described hereinabove and other technical objects not described herein will be more clearly understood by persons skilled in the art from the following detailed description.

Technical Solution

In an aspect of the present invention for solving the above-described problem, provided herein is a method for performing relay control by a relay User Equipment (UE) in a wireless communication system, including announcing information about whether the relay UE is capable of performing relaying; and performing relay control by comparing updated information according to a new relay request with reference information, wherein the reference information is set to be changed based on at least one of state information of the relay UE and a Packet Data Network (PDN) connection associated with relaying.

The reference information may include at least one of a maximum number of relayed UEs, a maximum number of relayed groups, a maximum amount of relayed traffic, a maximum number of the PDN connections, a maximum number of relayed Multimedia Broadcast Multicast Services (MBMSs), a maximum number of relayed radio frequencies, and a maximum number of relayed MBMS over a Single Frequency Network (MBSFN) areas.

The state information of the relay UE may include the number of at least one group for which the relay UE performs relaying and the reference information may be set to decrease a maximum value of the reference information when the number of the at least one group is greater than a preset value for preventing service degradation. Desirably, if the at least one group uses the same PDN connection, the number of relayed UEs associated with each of the at least one group may be set to be decreased and, if the at least one group uses different PDN connections, the number of relayed UEs associated with each of the at least one group may be set not to be decreased.

The state information of the relay UE may include the number of media of group communication for which the relay UE performs relaying and a maximum value of the reference information may be set to be decreased when the number of the media of group communication is greater than a preset value for preventing service degradation.

The state information of the relay UE includes types of media of group communication for which the relay UE performs relaying and a maximum value of the reference information may be set to be decreased when a preset media type is included in the types of the media of group communication to prevent service degradation.

The state information of the relay UE may include a remaining battery amount of the relay UE and a maximum value of the reference information may be set to be decreased when the battery amount is greater than a preset value for preventing service degradation.

The reference information may be set to be periodically changed.

The relay request may be an IP address or IPv6 prefix allocation request.

In another aspect of the present invention for solving the above-described problem, provided herein is a relay User Equipment (UE) for performing relay control in a wireless communication system, including a radiofrequency unit; and a processor, wherein the processor is configured to announce information about whether the relay UE is capable of performing relaying and to perform relay control by comparing updated information according to a new relay request with reference information and the reference information is set to be changed based on at least one of state information of the relay UE and a Packet Data Network (PDN) connection associated with relaying.

Advantageous Effects

According to the present invention, service degradation can be prevented by controlling a relay according to reference information.

The effects that can be achieved through the present invention are not limited to what has been particularly described hereinabove and other advantages not described herein will be more clearly understood by persons skilled in the art from the following detailed description.

DESCRIPTION OF DRAWINGS

The accompanying drawings, which are included to provide a further understanding of the invention, illustrate embodiments of the invention and together with the description serve to explain the principle of the invention.

BEST MODE

Figure 1:
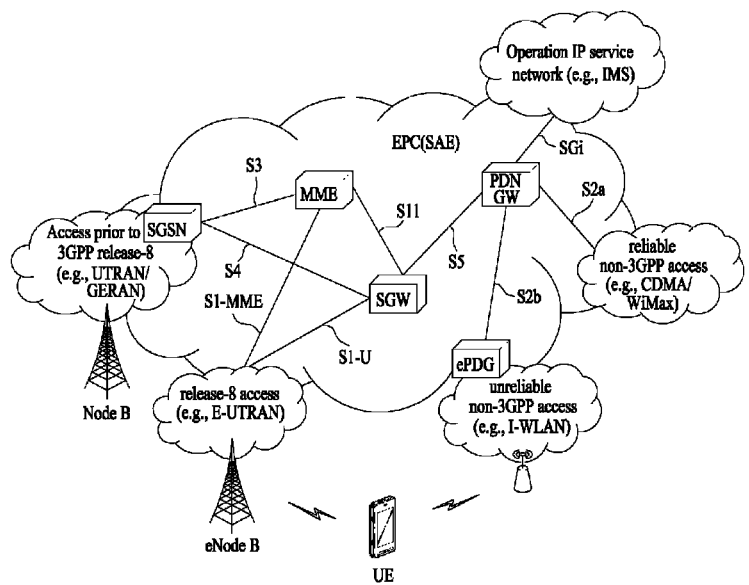
FIG. 1 is a view schematically illustrating the architecture of an Evolved Packet System (EPS) including an Evolved Packet Core (EPC).

The embodiments of the present invention described above are combinations of elements and features of the present invention in a predetermined form. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment.

Specific terms used in the following description are provided to aid in understanding the present invention and these specific terms may be replaced with other terms within the scope and spirit of the present invention.

In some instances, well-known structures and devices are omitted in order to avoid obscuring the concepts of the present invention and the important functions of the structures and devices are shown in block diagram form. The same reference numbers will be used throughout the drawings to refer to the same or like parts.

Embodiments of the present invention can be supported by standard documents disclosed for at least one of wireless access systems such as institute of electrical and electronics engineers (IEEE) 802, 3rd generation partnership project (3GPP), 3GPP long term evolution (3GPP LTE), LTE-advanced (LTE-A), and 3GPP2 systems. For steps or parts, description of which is omitted to clarify the technical features of the present invention, reference may be made to these documents. Further, all terms as set forth herein can be explained by the standard documents.

The following technology can be used in various wireless communication systems. For clarity, a description will be given focusing on the 3GPP LTE and 3GPP LTE-A systems. However, the technical spirit of the present invention is not limited thereto.

Terminologies used in this disclosure are defined as follows.

UMTS (Universal Mobile Telecommunications System): 3rd generation mobile communication technology based on Global System for Mobile Communication (GSM), developed by 3GPP.

EPS (Evolved Packet System): A network system comprised of an Evolved Packet Core (EPC), which is an Internet Protocol (IP) based packet switched core network, and an access network such as LTE or UMTS Terrestrial Radio Access Network (UTRAN). EPS evolved from UMTS.

NodeB: A Base Station (BS) of GERAN/UTRAN. NodeB is installed outdoors and coverage thereof is a macro cell size.

eNodeB: A BS of LTE. eNodeB is installed outdoors and coverage thereof is a macro cell size.

UE (User Equipment): UE may be referred to as terminal, Mobile Equipment (ME), or Mobile Station (MS). UE may be a portable device, such as a notebook, a cellular phone, a Personal Digital Assistant (PDA), a smartphone, or a multimedia device or may be a non-portable device such as a PC (Personal Computer) or a vehicle mounted device. UE can perform communication using a 3GPP spectrum such as LTE and/or a non-3GPP spectrum such as a spectrum for Wi-Fi or public safety.

ProSe (Proximity Services or Proximity-based Services): Services enabling discovery between physically adjacent devices and direct communication between devices/communication via an eNodeB/communication via a third device. In this case, user plane data is exchanged via a direct data path (or a direct mode data path) without passing through a 3GPP core network (e.g., an EPC). ProSe is referred to as D2D service.

Proximity: Whether any UE is in proximity to another UE is determined according to whether a predetermined proximity criterion is satisfied. The proximity criterion may be differently given with respect to ProSe discovery and ProSe communication. In addition, the proximity criterion may be set as a control target of an operator.

ProSe discovery: Process identifying whether a UE is in proximity of another UE, using E-UTRA.

ProSe communication: Communication between UEs in proximity by means of a communication path established between UEs. The communication path may be directly formed between UEs or may be routed through local eNodeB(s).

ProSe-enabled UE: A UE supporting ProSe discovery and/or ProSe communication. Hereinafter, a ProSe-enabled UE is referred to as a UE.

ProSe-enabled Network: A network supporting ProSe discovery and/or ProSe communication. Hereinafter, a ProSe-enabled network is referred to as a network.

ProSe E-UTRA communication: ProSe communication using a ProSe E-UTRA communication path.

ProSe-assisted WLAN direct communication: ProSe communication using a ProSe-assisted WLAN direct communication path. ProSe-assisted WLAN direct communication may be referred to as EPC-assisted WLAN direct communication.

ProSe group communication: One-to-many ProSe communication between two or more ProSe-enabled UEs in proximity by means of a common communication path established between ProSe-enabled UEs.

ProSe broadcast communication: One-to-all ProSe communication between two or more ProSe-enabled UEs in proximity, by means of a common communication path established between ProSe-enabled UEs.

ProSe UE-to-Network Relay: A form of a relay in which a public safety ProSe-enabled UE acts as a communication relay between a public safety ProSe-enabled UE and a ProSe-enabled network using E-UTRA.

ProSe UE-to-UE Relay: A form of a relay in which a public safety ProSe-enabled UE acts as a ProSe communication relay between public safety ProSe-enabled UEs.

RAN (Radio Access Network): A unit including a NodeB, an eNodeB, and a Radio Network Controller (RNC) controlling the NodeB and the eNodeB in a 3GPP network, which is present between a UE and a core network and provides a connection to the core network.

HLR (Home Location Register)/HSS (Home Subscriber Server): A database including subscriber information in a 3GPP network. The HSS may perform functions such as configuration storage, identity management, and user state storage.

RANAP (RAN Application Part): An interface between a RAN and a node (Mobility Management Entity (MME)/Serving General Packet Radio Service (GPRS) Supporting Node (SGSN)/Mobiles Switching Center (MSC)) which is in charge of controlling a core network.

PLMN (Public Land Mobile Network): A network configured for the purpose of providing mobile communication services to individuals. This network may be configured per operator.

NAS (Non-Access Stratum): A functional layer for exchanging signaling or traffic messages between a UE and a core network in a UMTS protocol stack. Major functions of the NAS are to support UE mobility and to support a session management procedure for establishing and maintaining an IP connection between a UE and a Packet Data Network Gateway (PDN GW).

HNB (Home NodeB): A Customer Premises Equipment (CPE) providing UTRAN coverage. For more details, refer to standard document TS 25.467.

HeNodeB (Home eNodeB): A CPE providing Evolved-UTRAN (E-UTRAN) coverage. For more details, refer to standard document TS 36.300.

CSG (Closed Subscriber Group): A subscribed group permitted to access one or more CSG cells in a Public Land Mobile Network (PLMN) as a member of a CSG of an H(e)NB.

LIPA (Local IP Access): Access by an IP capable UE to an entity IP having a different IP function in the same residential/enterprise IP network via an H(e)NB. LIPA traffic does not pass through a mobile communication operator network. In a 3GPP release-10 system, access for resources of a local network (i.e., a network located in a customer house or an office building) via an H(e)NB is provided.

SIPTO (Selected IP Traffic Offload): In a 3GPP release-10 system, an operator supports transfer of user traffic by selecting a Packet data network GateWay (PGW) physically adjacent to a UE in an EPC network.

PDN (Packet Data Network) connection: A logical connection between a UE which is represented as one IP address (one IPv4 address and/or one IPv6 prefix) and a PDN which is represented as an Access Point Name (APN).

EPC (Evolved Packet Core)

FIG. 1 is a view schematically illustrating the architecture of an Evolved Packet System (EPS) including an Evolved Packet Core (EPC).

The EPC is a core element of System Architecture Evolution (SAE) for improving the performance of 3GPP technology. SAE corresponds to a study item for deciding a network structure supporting mobility among various types of network. SAE aims to provide, for example, an optimized packet-based system which supports various radio access technologies based on IP and provides improved data transfer capabilities.

Specifically, the EPC is a core network of an IP mobile communication system for a 3GPP LTE system and may support packet-based real-time and non-real-time services. In a legacy mobile communication system (e.g., 2nd or 3rd generation mobile communication system), a core network function is implemented through two separated sub-domains, e.g., circuit-switched (CS) sub-domain for sound and packet-switched (PS) sub-domain for data. However, in a 3GPP LTE system which is evolved from the 3rd generation communication system, the CS and PS sub-domains are unified into a single IP domain. For example, in the 3GPP LTE system, IP-capable UEs can be connected via an IP-based base station (e.g., eNodeB (evolved Node B)), an EPC, an application domain (e.g., IMS (IP Multimedia Subsystem)). That is, the EPC is a structure inevitably required to implement end-to-end IP service.

The EPC may include various components and FIG. 1 illustrates a few of the components, e.g., Serving GateWay (SGW), Packet Data Network GateWay (PDN GW), Mobility Management Entity (MME), Serving GPRS (General Packet Radio Service) Supporting Node (SGSN), and enhanced Packet Data Gateway (ePDG).

The SGW operates as a boundary point between a Radio Access Network (RAN) and a core network and is an element which performs a function for maintaining a data path between an eNodeB and a PDG GW. In addition, if a UE moves across an area served by an eNodeB, the SGW serves as a local mobility anchor point. That is, packets may be routed via the SGW for mobility in an Evolved-UMTS (Universal Mobile Telecommunications System) Terrestrial Radio Access Network (E-UTRAN) defined after 3GPP Release-8. Further, the SGW may serve as an anchor point for mobility management with another 3GPP network such as RAN defined before 3GPP Release-8, e.g., UTRAN or GSM (Global System for Mobile communication)/EDGE (Enhanced Data rates for GSM Evolution) Radio Access Network (GERAN).

The PDN GW (or P-GW) corresponds to a termination point of a data interface directed to a packet data network. The PDN GW may support policy enforcement features, packet filtering and charging support. In addition, the PDN GW may serve as an anchor point for mobility management with a 3GPP network and a non-3GPP network (e.g., untrusted network such as Interworking Wireless Local Area Network (I-WLAN) and trusted network such as Code Division Multiple Access (CDMA) or WiMax).

Although the SGW and the PDN GW are configured as separate gateways in the network architecture of FIG. 1, the two gateways may be implemented according to a single gateway configuration option.

The MME performs signaling and control functions to support access of a UE for network connection, network resource allocation, tracking, paging, roaming and handover.

The MME controls control plane functions related to subscriber and session management. The MME manages a large number of eNodeBs and performs signaling for selection of a typical gateway for handover to another 2G/3G network. In addition, the MME performs security procedures, terminal-to-network session handling, idle terminal location management, etc.

The SGSN handles all packet data such as mobility management and authentication of a user for another 3GPP network (e.g., GPRS network).

The ePDG serves as a security node for an untrusted non-3GPP network (e.g., I-WLAN, Wi-Fi hotspot, etc.).

As described above in relation to FIG. 1, an IP-capable UE may access an IP service network (e.g., IMS) provided by an operator, via various elements in the EPC based on non-3GPP access as well as 3GPP access.

FIG. 1 also illustrates various reference points (e.g., S1-U, S1-MME, etc.). In the 3GPP system, a conceptual link connecting two functions of different functional entities of E-UTRAN and EPC is defined as a reference point. Table 1 lists the reference points illustrated in FIG. 1. In addition to the examples of Table 1, various reference points may be present according to network architectures.

plane with related control and mobility support between the ePDG and the PDNGW.

Control Mechanism for Providing Proximity Service (ProSe)

The present invention proposes a control mechanism for supporting ProSe or a D2D service in a mobile communication system such as a 3GPP EPS.

Due to increase in user demands related to SNS, etc., demand for detection/discovery and special applications/services (e.g., proximity-based applications/services), between physically adjacent users/devices, has arisen. To provide such services even in a 3GPP mobile communication system, potential use cases and scenarios of the ProSe and potential service requirements are under discussion.

The potential use cases of the ProSe may include a commercial/social service, network offloading, public safety, and integration of current infrastructure services (to assure the consistency of user experience including reachability and mobility aspects). In addition, use cases and potential requirements for public safety in the case of absence of E-UTRAN coverage (in this case, limiting the use cases to specific frequency bands and specific terminals that are designated for public safety under the condition that specific regional regulation and operator policy are satisfied, should be considered) are under discussion.

In particular, the scope of discussion of the ProSe that is underway in 3GPP assumes that the proximity-based applications/services are provided via LTE or a WLAN and that discovery and communication are performed between devices under the control of an operator/network.

Figure 2:
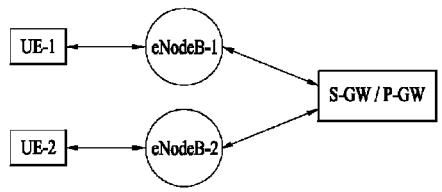
FIG. 2 is a view illustrating a default data path for communication between two UEs in an EPS.

FIG. 2 is a view illustrating a default data path for communication between two UEs in an EPS. That is, FIG. 2 illustrates an exemplary data path between UE-1 and UE-2 in a general case in which ProSe between UE-1 and UE-2 is not applied. This default path passes through a base station (e.g., an eNodeB or HeNodeB) and gateway nodes (e.g., an EPC or operator network). For example, as illustrated in FIG. 2, when UE-1 and UE-2 exchange data, data from

TABLE 1

| Reference Point | Description |
| --- | --- |
| S1-MME | Reference point for the control plane protocol between E-UTRAN and MME |
| S1-U | Reference point between E-UTRAN and Serving GW for the per bearer user plane tunneling and inter eNodeB path switching during handover |
| S3 | It enables user and bearer information exchange for inter 3GPP access network mobility in idle and/or active state. This reference point can be used intra-PLMN or inter-PLMN (e.g. in the case of Inter-PLMN HO). |
| S4 | It provides related control and mobility support between GPRS Core and the 3GPP Anchor function of Serving GW. In addition, if Direct Tunnel is not established, it provides the user plane tunneling. |
| S5 | It provides user plane tunneling and tunnel management between Serving GW and PDN GW. It is used for Serving GW relocation due to UE mobility and if the Serving GW needs to connect to a non-collocated PDN GW for the required PDN connectivity. |
| S11 | Reference point between MME and SGW |
| SGi | It is the reference point between the PDN GW and the packet data network. Packet data network may be an operator external public or private packet data network or an intra operator packet data network, e.g. for provision of IMS services. This reference point corresponds to Gi for 3GPP accesses. |

Among the reference points illustrated in FIG. 1, S2a and S2b correspond to non-3GPP interfaces. S2a is a reference point for providing a user plane with related control and mobility support between the trusted non-3GPP access and the PDNGW. S2b is a reference point for providing a user UE-1 may be transmitted to UE-2 via eNodeB-1, an S-GW/P-GW, and eNodeB-2 and, likewise, data from UE-2 may be transmitted to UE-1 via eNodeB-2, an S-GW/P-GW, and eNodeB-1. Although UE-1 and UE-2 are camping on different eNodeBs in FIG. 2, UE-1 and UE-2 may camp on the same eNodeB. In addition, although the two UEs are served by the same S-GW and P-GW in FIG. 2, various combinations of services are allowed. For example, the UEs may be served by the same S-GW and different P-GWs, by different S-GWs and the same P-GW, or by different S-GWs and different P-GWs.

In the present invention, such a default data path may be referred to as an infrastructure data path (i.e., infrastructure path or an infrastructure communication path). In addition, communication via the infrastructure data path may be referred to as infrastructure communication.

Figure 3:
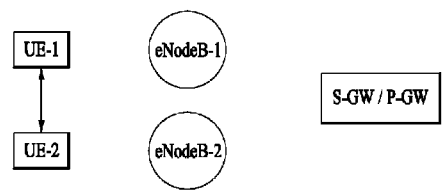
FIG. 3 is a view illustrating a direct mode data path between two UEs based on ProSe.
Figure 3:
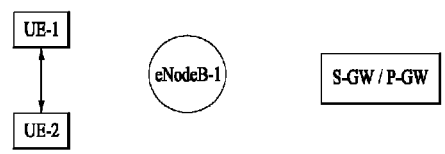

FIG. 3 is a view illustrating a direct mode data path between two UEs based on ProSe. Such a direct mode communication path does not pass through a BS (i.e., an eNodeB or a Home eNodeB) and gateway nodes (i.e., an EPC).

FIG. 3(a) exemplarily illustrates the case in which UE-1 and UE-2 camp on different eNodeBs (i.e., eNodeB-1 and eNodeB-2) and exchange data through a direct mode communication path. FIG. 3(b) exemplarily illustrates the case in which UE-1 and UE-2 camp on the same eNodeB (i.e., eNodeB-1) and exchange data through a direct mode communication path.

Meanwhile, it should be noted that, although a user plane data path is directly formed between UEs without passing through an eNodeB or a gateway node as illustrated in FIG. 3, a control plane path may be formed through the eNodeB and a core network. Control information exchanged via the control plane path may be information regarding session management, authentication, authorization, security, and charging. In ProSe communication of UEs served by different eNodeBs as illustrated in FIG. 3(a), control information for UE-1 may be exchanged with a control node (e.g., an MME) of a core network via eNodeB-1 and control information for UE-2 may be exchanged with the control node (e.g., the MME) of the core network via eNodeB-2. In ProSe communication of UEs served by the same eNodeB as illustrated in FIG. 3(b), control information for UE-1 and UE-2 may be exchanged with the control node (e.g., the MME) of the core network via eNodeB-1.

Figure 4:
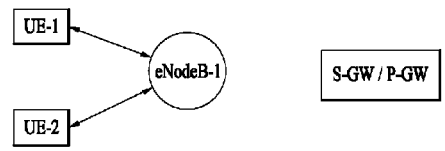
FIG. 4 is a view illustrating a locally routed data path between two UEs based on ProSe.

FIG. 4 is a view illustrating a locally routed data path between two UEs based on ProSe. As illustrated in FIG. 4, a ProSe communication data path between UE-1 and UE-2 is formed via eNodeB-1 but does not pass through a gateway node (e.g., an EPC) managed by an operator. Meanwhile, when the locally routed data path between UEs served by the same eNodeB is configured as illustrated in FIG. 4, control information for UE-1 and UE-2, exchanged through a control plane path may be exchanged with a control node (e.g., an MME) of a core network via eNodeB-1.

In the present invention, the communication path described with reference to FIGS. 3 and 4 may be referred to as a direct data path, a data path for ProSe, a ProSe based data path, or a ProSe communication path. In addition, communication through the direct data path may be referred to as direct communication, ProSe communication, or ProSe based communication.

The afore-mentioned ProSe UE-to-Network Relay and ProSe UE-to-UE Relay may be used for public safety as described below and, for more details thereof, refer to the LTE standard document 3GPP LTE TS 22.278.

ProSe communication may be facilitated by the use of a ProSe UE-to-Network Relay which acts as a relay between an E-UTRAN and UEs not served by the E-UTRAN. The use of this relay function is controlled by a mobile communication operator.

In addition, ProSe communication may also take place over a ProSe UE-to-UE Relay. The ProSe UE-to-UE Relay may be a public safety ProSe-enabled UE acting as a ProSe E-UTRA communication relay between two different public safety ProSe-enabled UEs.

In the LTE/LTE-A standard document 3GPP TS 22.278, service requirements are defined in relation to relay functionality as follows: The user of a public safety ProSe-enabled UE acting as a relay should not perceive service degradation due to its use as a relay, regardless of whether or not the public safety ProSe-enabled UE is served by an E-UTRAN.

Two models for direct discovery defined in 3GPP LTE TR 23.703 are defined as "Model A" and "Model B" as follows.

Model A ("I am here"): This model defines roles of UEs participating in direct discovery as follows.

Announcing UE: The announcing UE announces certain information that can be used by UEs in proximity that have permission to discover.

Monitoring UE: The monitoring UE receives certain information that is interested by other UEs in proximity.

According to Model A, the announcing UE broadcasts discovery messages at predefined discovery intervals and UEs that are interested in the broadcast messages receive and process the messages. Model A is equivalent to "I am here" since the announcing UE broadcasts information thereabout, e.g., a ProSe application identity or a ProSe UE identity in the discovery message.

Model B ("who is there"/"are you there"): This model defines roles of UEs that participate in direct discovery as follows.

Discoverer UE: The UE transmits a request containing certain information about what is interested to discover.

Discoveree UE: The UE receives a request message of a discoverer UE and responds with some information related to the request.

Model B is equivalent to "who is there"/"are you there" and the discoverer UE transmits information to other UEs that desire to receive responses. For example, information about a ProSe application identity corresponding to a group (performing group communication) and members of the group that can respond may be transmitted.

However, conventionally, a method for preventing service degradation undergone when a ProSe UE-to-Network Relay or a ProSe UE-to-UE Relay provides a relay function to other UEs undergoes has not been specifically disclosed.

Accordingly, the present invention provides a load control/relay control method for preventing and solving service degradation that a ProSe UE-to-Network Relay and a ProSe UE-to-UE Relay (hereinafter, a relay UE) undergoes.

Control Method of Relay UE According to the Present Invention

The present invention proposes a load control/relay control method when ProSe is provided in a mobile communication system such as a 3GPP EPS. The load control/relay control method for a relay UE proposed in the present invention may be configured by a combination of at least one of 1) an operation in which a relay-capable UE manages relay related information, 2) an operation in which a relay-capable UE determines whether to inform others UE of a relay function thereof, and 3) an operation in which a relay-capable UE making a judgment about a new relay request. Hereinafter, the above operations 1) to 3) proposed in the present invention will be described in detail.

1. Information Management Operation of Relay-Capable UE

A UE capable of acting as a relay (a ProSe UE-to-Network Relay and/or a ProSe UE-to-UE Relay) may maintain/manage information according to 1-1) to 1-3) in relation to relaying.

1-1) A UE capable of acting as a relay (i.e., a ProSe UE-to-Network Relay and/or a ProSe UE-to-UE Relay) may maintain/manage one or more of reference information (or threshold information) among 1-1-1) to 1-1-7) described below in relation to load control/relay control/threshold control/capacity control.

1-1-1) At least one of a maximum number of UEs for which the relay UE is capable of performing a relay role, a maximum number of UEs capable of being relayed, and a maximum number of UEs to which the relay UE is capable of providing a relay function: This may be a maximum number of UEs with respect to each of the ProSe UE-to-Network Relay and the ProSe UE-to-UE Relay or may be a maximum number of UEs in an integrated form (i.e., commonly applied) with respect to two relay functions. In addition, even for the maximum number of UEs with respect to each of the ProSe UE-to-Network Relay and the ProSe UE-to-UE Relay, reference information for the sum of two numbers (i.e., maximum numbers of UEs set in the respective relays) may be additionally provided.

For the ProSe UE-to-Network Relay, the reference information may be a maximum number of UEs for which the relay UE is capable of performing a relay role, per PDN that the relay UE establishes for a connection to a network (i.e., an EPC). The PDN may be a PDN established only for relaying.

1-1-2) At least one of a maximum number of groups for which the relay UE is capable of acting as a relay, a maximum number of groups capable of being relayed, and a maximum number of groups to which the relay UE is capable of providing a relay function: This may have a maximum number of groups with respect to each of the ProSe UE-to-Network Relay and the ProSe UE-to-UE Relay or may have a maximum number of groups in an integrated form (i.e., commonly applied) with respect to two relay functions. In addition, even for a maximum number of groups with respect to each of the ProSe UE-to-Network Relay and the ProSe UE-to-UE Relay, reference information for the sum of two numbers (i.e., maximum numbers of groups set in the respective relays) may be additionally provided.

For the ProSe UE-to-Network Relay, the reference information may be a maximum number of groups for which the relay UE is capable of performing a relay role, per PDN that the relay UE establishes for a connection to a network (i.e., an EPC). The PDN may be a PDN established only for relaying.

1-1-3) At least one of information about a maximum amount of traffic for which the relay UE is capable of performing a relay role, information about a maximum amount of traffic capable of being relayed, and information about a maximum amount of traffic that the relay UE is capable of relaying: In this case, one or more of information about traffic amount may be defined in various forms as follows.

i) At least one of transmittable uplink (UL) traffic amount per reference time, ii) transmittable downlink (DL) traffic amount per reference time, and iii) the sum of the transmittable UL traffic amount per reference time and the transmittable DL traffic amount per reference time. In this case, values of i), ii), and iii) may be determined according to an average value or may be determined according to a maximum value.

i) At least one of transmittable UL traffic rate per reference time, ii) transmittable DL traffic rate per reference time, iii) and the sum of the transmittable UL traffic rate per reference time and the transmittable DL traffic rate amount per reference time: In this case, values of i), ii), and iii) may be determined according to an average value or may be determined according to a maximum value.

i) At least one of a maximum bit rate of UL traffic, ii) a maximum bit rate of DL traffic, iii) and the sum of the maximum bit rate of UL traffic and the maximum bit rate of DL traffic.

i) At least one of a guaranteed bit rate of UL traffic, ii) guaranteed bit rate of DL traffic, and iii) the sum of the guaranteed bit rate of UL traffic and the guaranteed bit rate of DL traffic.

For the ProSe UE-to-Network Relay, the reference information may be information about a maximum traffic amount with which the relay UE is capable of performing a relay role, per PDN that the relay UE establishes for a connection to a network (i.e., an EPC). The PDN may be a PDN established only for relaying.

1-1-4) At least one of a maximum number of PDN connections, a maximum number of IP connections, or a maximum number of sessions, generated for a relay role, and a maximum number of IP addresses/IPv6 prefixes allocated to a relayed UE: In this case, the PDN connections, IP connections, or sessions are generated/formed between a UE capable of acting as a relay UE (i.e., a ProSe UE-to-Network Relay and/or a ProSe UE-to-UE Relay) and a relayed UE.

Reference information according to 1-1-4) may be a maximum number with respect to each of the ProSe UE-to-Network Relay and the ProSe UE-to-UE Relay or may be a maximum number of UEs in an integrated form (i.e., commonly applied) with respect to two relay functions. In addition, even for a maximum number with respect to each of the ProSe UE-to-Network Relay and the ProSe UE-to-UE Relay, reference information for the sum of two numbers (i.e., maximum numbers for the respective relays) may be additionally provided.

In addition, at least one of the maximum number of PDN connections, the maximum number of IP connections, the maximum number of sessions, and the maximum number of IP addresses/IPv6 prefixes allocated to a relayed UE may be a maximum number with respect to each of an IPv4 type and an IPv6 type or may be a maximum number in an integrated form of the two types (i.e., in one commonly applied form). Even for a maximum number with respect to each of the IPv4 type and the IPv6 type, reference information for the sum of two numbers (i.e., maximum numbers of the IPv4 type and the IPv6 type) may be additionally provided.

In the case of the ProSe UE-to-Network Relay, the reference number may be one of a maximum number of PDN connections, a maximum number of IP connections, and a maximum number of sessions, capable of performing a relay role, and a maximum number of IP addresses/IPv6 prefixes allocated to a relayed UE, per PDN that the relay UE establishes for a connection to a network (i.e., an EPC). The PDN established for a connection to the EPC may be a PDN established only for relaying.

1-1-5) A maximum number of multimedia broadcast multimedia services (MBMSs) or a maximum number of Temporary Mobile Group Identities (TMGIs), capable of providing or performing a relay function/role or capable of being relayed: This may have a maximum number of MBMSs or a maximum number of TMGIs with respect to each of a ProSe UE-to-Network Relay and a ProSe UE-to-UE Relay or may have a maximum number of MBMSs or a maximum number of TMGIs in an integrated form (i.e., in one commonly applied form) with respect to two relay functions (the ProSe UE-to-Network Relay and the ProSe UE-to-UE Relay). Even for the maximum number of MBMSs or the maximum number of TMGIs with respect to each of the ProSe UE-to-Network Relay and the ProSe UE-to-UE Relay, reference information for the sum of two numbers (i.e., maximum numbers of the respective relays) may be additionally provided.

1-1-6) At least one of a maximum number of radio frequencies capable of providing or performing a relay function/role or capable of being relayed and a maximum number of radio frequencies for receiving an MBMS: This may have a maximum number of radio frequencies with respect to each of a ProSe UE-to-Network Relay and a ProSe UE-to-UE Relay or may have a maximum number of radio frequencies in an integrated form (i.e., in one commonly applied form) with respect to two relay functions. Even for a maximum number of radio frequencies with respect to each of the ProSe UE-to-Network Relay and the ProSe UE-to-UE Relay, reference information for the sum of two maximum numbers may be additionally provided.

Typically, a maximum number of radio frequencies may be set to 1. However, when carrier aggregation (CA) can be configured, the maximum number of radio frequencies may be set to 2 and may be set to various values based on radio capabilities of a UE providing a relay function.

1-1-7) A maximum number of MBMS over a Single Frequency Network (MBSFN) areas capable of providing or performing a relay function/role or capable of being relayed: This may have a maximum number of MBSFN areas with respect to each of a ProSe UE-to-Network Relay and a ProSe UE-to-UE Relay or may have a maximum number of radio frequencies in an integrated form (i.e., in one commonly applied form) with respect to two relay functions. Even for a maximum number of MBSFN areas with respect to each of the ProSe UE-to-Network Relay and the ProSe UE-to-UE Relay, reference information for the sum of two maximum numbers may be additionally provided.

In addition to the above-described reference information (or threshold information) of 1-1-1) to 1-1-7), various information may be maintained/managed in relation to load control/relay control/threshold control/capacity control of a relay function. In addition, the information of 1-1-1), 1-1-3), and 1-1-4) may be maintained/managed on a per-group basis. For example, in the case of 1-1-1), information may be maintained/managed in the form of a maximum number of UEs capable of acting as a relay, per group. The above-described information may be maintained/managed by various levels/layers and various granularities through various combinations. Although the above description has been given focusing only on maintenance/management for convenience of description, the present invention should be interpreted as including all concepts of storage, update, deletion, generation, and elimination.

The above-described information may be configured for a UE and provided in various forms at various timings from a network. The network node may correspond to one or more of, for example, a network node, such as an MME or an SGSN, for managing mobility, a network node, such as an HSS, for maintaining subscriber information, a network node, such as a ProSe server (or ProSe function), performing an operation for managing ProSe related information, making a determination related to ProSe, and/or providing the ProSe related information to a UE, as a server (or a function) developed to provide ProSe, a server (or a function), such as a Group Communication Service Enabler Application Server (GCSE AS), developed to provide group communication, an Authentication Authorization Accounting (AAA) server or an AAA proxy, involved in authentication, an Access Network Discovery and Selection Function (ANDSF) entity, a gateway node such as a P-GW, and an eNodeB. This may be applied throughout the present invention.

1-2) A UE capable of acting as a relay (a ProSe UE-to-Network Relay and/or a ProSe UE-to-UE Relay) maintains/manages current information/updated information/latest information mapped to the reference information (or threshold information) described in operation 1-1).

For example, upon maintaining/managing 1-1-1), the relay UE may maintain/manage the number of UEs to which the relay UE currently provides a relay function. In this case, the relay UE may maintain/manage at least one of information of a proper form among the number of UEs to which a ProSe UE-to-Network Relay function is provided, the number of UEs to which a ProSe UE-to-UE Relay function is provided, and the sum of the two numbers. In addition, the UE acting as a relay may maintain/manage information such as identity information (e.g., an ID or an address) of a UE to which the relay UE currently provides a relay function.

As another example, upon maintaining/managing 1-1-2), the relay UE may maintain/manage the number of groups to which the relay UE provides a relay function. In this case, the relay UE may maintain/manage at least one of information of a proper form among the number of groups to which a ProSe UE-to-Network Relay function is provided, the number of groups to which a ProSe UE-to-UE Relay function is provided, and the sum of the two numbers. In addition, the UE acting as a relay may maintain/manage information such as identity information (e.g., an ID or an address) of a group to which the relay UE currently provides a relay function.

1-3) A UE capable of acting as a relay (a ProSe UE-to-Network Relay and/or a ProSe UE-to-UE Relay) may dynamically change/adjust a maximum value (or a maximum number or maximum amount) of the reference information (or threshold information) described in operation 1-1).

A maximum value of each value of the reference information described in operation 1-1) may be increased or decreased according to the following one or more values of state information. Typically, the maximum value of the reference information is changed/adjusted to a decreased value in order to minimize or prevent service degradation of the relay UE and additionally to minimize or avoid service degradation of UEs that receive relaying from the relay UE. Conversely, the maximum value of the reference information is changed/adjusted to an increased value because service degradation of the relay UE is generated even after the maximum value is changed/adjusted to minimize service degradation and because UEs that receive relaying from the relay UE do not cause service degradation.

a) State information of a UE capable of acting as a relay (a ProSe UE-to-Network Relay and/or a ProSe UE-to-UE Relay) may include one or more of the following information.

a-1) The number of groups (or group communication) in which the relay UE participates: If the number of the groups (or group communication) is equal to or greater than a predetermined number or exceeds the predetermined number, the maximum value of each reference information of operation 1-1) may be decreased and, if the number of the groups (or group communication) is equal to or less than a predetermined number or under the predetermined number, the maximum value of each reference information may be increased or maintained.

a-2) The number and/or types of media of all group communications in which the relay UE participates: If the number of the media is equal to or greater than a predetermined number or exceeds the predetermined number, the maximum value of each reference information of operation 1-1) may be decreased and, if the number of the media is equal to or less than a predetermined number or under the predetermined number, the maximum value of each reference information of operation 1-1) may be increased or maintained. Additionally/alternatively, if a specific medium (e.g., video) is included in the types of the media, the maximum value of each reference information of operation 1-1) may be decreased and, if a specific media is not included, the maximum number of each reference information of operation 1-1) may be increased or maintained.

a-3) The number of PDN connections that the relay UE generates (including PDN connections that the relay UE uses to provide relaying and PDN connections that the relay UE uses): If the number of the PDN connections is equal to or greater than a predetermined number or exceeds the predetermined number, the maximum value of each reference information of operation 1-1) may be decreased and, if the number of the PDN connections is equal to or less than a predetermined number or under the predetermined number, the maximum value of each reference information of operation 1-1) may be increased or maintained.

a-4) Remaining battery amount of the relay UE: If the amount is equal to or greater than a predetermined level or exceed the predetermined level, the maximum value of each reference information of operation 1-1) may be increased or maintained and, if the amount is equal to or less than a predetermined level or under the predetermined level, the maximum value of each reference information may be decreased.

b) A correlation between groups to which relaying is provided and PDN connections that the groups use: If the number of groups to which relaying is provided through the same PDN connection is equal to or greater than a predetermined number or exceeds the predetermined number, the relay UE may decrease a maximum number of UEs capable of providing relaying with respect to each of the groups providing relaying through the PDN connection and, if the number of groups to which relaying is provided through the same PDN connection is equal to or less than a predetermined number or under the predetermined number, the relay UE may increase or maintain a maximum number of UEs capable of providing relaying with respect to each of the groups to which relaying is provided through the PDN connection. Further, if different PDN connections are used for groups to which relaying is provided (or if a sharing level of PDN connections is low), the relay UE may increase or maintain a maximum number of UEs capable of providing relaying to each of the groups and, if a sharing level of PDN connections used for groups to which relaying is provided is high, the relay UE may decrease a maximum number of UEs capable of providing relaying to each of the groups.

Furthermore, as described in a) and b), the operation of dynamically changing/adjusting the maximum value/maximum number/maximum amount of the reference information (or threshold information) described in operation 1-1) may be periodically performed or may be performed due to change of the state information of the UE. In addition, the maximum value may be configured as an upper limit value (i.e., incapable of being changed/adjusted to a greater value upon reaching the upper limit value) and/or a lower limit value (i.e., incapable of being changed/adjusted to a lower value upon reaching the lower limit value).

2. Operation of Determining Notification of Relay Function by Relay UE

According to the present invention, a UE capable of acting as a relay (a ProSe UE-to-Network Relay and/or a ProSe UE-to-UE Relay) may perform at least one of operations 2-1 to 2-3 described below in order to determine whether to inform other UEs that the UE has a relay function.

2-1) A UE capable of acting as a relay (a ProSe UE-to-Network Relay and/or a ProSe UE-to-UE Relay) may inform other UEs of relay function related information thereof. A method for informing other UEs of the information may be performed by performing an announcing operation (e.g., periodically) or by including the information in a transmitted or received message in a discovery operation with other UEs. The announcing and discovery operations may be operations associated with a relay function or operations for performing a relay operation or may be a form included in a normal ProSe operation. The relay function related information may be one or more of information of various forms described below and may be explicitly or implicitly indicated.

Information indicating that the UE has a relay function or information indicating the UE is capable of performing a relay role Information indicating that the UE has a ProSe UE-to-Network Relay function or information indicating that the UE is capable of performing a ProSe UE-to-Network Relay role Information indicating that the relay UE has a ProSe UE-to-UE Relay function or information indicating that the relay UE is capable of performing a ProSe UE-to-UE Relay role Information indicating whether the UE is capable of performing relaying for ProSe one-to-one communication Information indicating whether the UE is capable of performing relaying for ProSe group communication Information indicating whether the relay UE supports an MBMS or information indicating whether the UE is capable of relaying MBMS traffic Information indicating which group the UE is capable of relaying if the UE is capable of performing relaying for ProSe group communication Information indicating for which MBMS (or TMGI) the UE is capable of performing relaying if the UE is capable of performing relaying for ProSe group communication Information as to whether the UE is capable of performing relaying for ProSe broadcast communication The UE capable of performing a relay role may provide various information related to a relay function to other UEs, in addition to the above-described information. The above-described information may be provided to other UEs in the form of combinations. For example, the UE may configure information per group capable of providing a relay function or per type (i.e., a UE-to-Network Relay or a UE-to-UE Relay) capable of providing a relay function and then provide the configured information.

A message including the above information may be various forms such as a signal, signaling, an Access Stratum (AS) message, a Non-Access Stratum (NAS) message, an IP Multimedia Subsystem (IMS) message, and a message newly defined to support ProSe or may be a message transmitted only to a specific UE or a message broadcast.

2-2) The operation of a UE capable of acting as a relay (a ProSe UE-to-Network Relay and/or a ProSe UE-to-UE Relay) (i.e., a relay UE) relay when a UE for which the relay UE should perform relaying (i.e., a relayed UE) is added will now be described.

The relay UE compares/evaluates/checks the reference information (or threshold information) maintained/managed in relation to load control/relay control/threshold control/capacity control described in operation 1-1) and one of the current information/updated information/latest information maintained or managed in operation 1-2). Therefore, as a result of comparison/evaluation/check, if the current information/updated information/latest information i) is the same as the reference information (or threshold information), ii) exceeds the reference information (or threshold information), or iii) is expected to exceed the reference information (or threshold information), the relay UE stops an operation of informing other UEs of relay function related information thereof described in operation 2-1) or does not provide the relay function related information to other UEs any longer.

Alternatively, as a result of comparison/evaluation/check, if part of the current information/updated information/latest information i) is the same as the reference information (or threshold information), ii) exceeds the reference information (or threshold information), or iii) is expected to exceed the reference information (or threshold information), the relay UE may provide, to other UEs, only information other than information related to the part of the current information/updated information/latest information (i.e., information which i) is the same as, ii) exceeds, or iii) is expected to exceed the reference information (or threshold information)) among the relay function information thereof described in operation 2-1).

As an example (hereinafter, example 2-2-a)), according to an embodiment of operation 2-2) of the present invention, it may be assumed that a relay UE should compare/evaluate/check a maximum number of UEs for which the relay UE is capable of performing a ProSe UE-to-Network Relay role, among information of 1-1-1) described in operation 1-1), and the maximum number of UEs for which the relay UE is capable of performing the ProSe UE-to-Network Relay role is 5. In this case, if the number of UEs for which the relay UE performs the ProSe UE-to-Network Relay role is 4 and the relay UE should additionally relay one new UE, the relay UE needs to perform the ProSe UE-to-Network Relay role with respect to 5 UEs. Therefore, the relay UE compares/evaluates/checks the above-described reference information or threshold information value and a current information/updated information/latest information value. As a result, since the current information/updated information/latest information value is equal to the reference information value (i.e., the two values are both 5), the relay UE may stop an operation of informing other UEs of the relay function related information thereof described in operation 2-1) or may not provide the relay function related information thereof to other UEs any longer.

As another example (hereinafter, example 2-2-b)), it may be assumed that the relay UE should compare/evaluate/check a maximum number of UEs for which the relay UE is capable of performing a ProSe UE-to-Network Relay role and a maximum number of groups for which the relay UE is capable of performing the ProSe UE-to-Network Relay role, among information of 1-1-1) described in operation 1-1), the maximum number of groups for which the relay UE is capable of performing the ProSe UE-to-Network Relay role is 3, and the relay UE is capable of relaying a maximum of 5 UEs with respect to each group. In this case, if the number of UEs for group#1 for which the relay UE performs the ProSe UE-to-Network Relay role is 4 and the relay UE should additionally relay one new UE, the relay UE needs to perform the ProSe UE-to-Network Relay role with respect to 5 UEs for group#1.

In this case, the relay UE compares/evaluates/checks the reference information or threshold information value and a current information/updated information/latest information value. As a result, since the current information/updated information/latest information value is equal to the reference information value (i.e., the two values are both 5), the relay UE may stop an operation of informing other UEs of the relay function related information described thereof in operation 2-1) or may not provide the relay function related information thereof to other UEs any longer. Alternatively, in the case of other groups (e.g., group#2 and group#3) to which the relay UE provides the relay function, if the number of UEs does not reach a maximum number of UEs for which the relay UE is capable of performing the ProSe UE-to-Network Relay role, the relay UE may continue to perform an operation of informing other UEs of the relay function related information with respect to group#2 and group#3 and may stop an operation of informing other UEs of the relay function related information only with respect to group#1.

As still another example (hereinafter, example 2-2-c)), it may be assumed that the relay UE should compare/evaluate/check a maximum number of UEs for which the relay UE is capable of performing a ProSe UE-to-Network Relay role with respect to each PDN that the relay UE establishes for a connection to a network (i.e., EPC), among information of 1-1-1) described in operation 1-1), and the maximum number of UEs for which the relay UE is capable of performing the ProSe UE-to-Network Relay role is 5 per PDN. In this case, if the number of UEs for PDN#1 for which the relay UE performs the ProSe UE-to-Network Relay role is 4 and the relay UE should additionally relay one new UE, the relay UE needs to perform the ProSe UE-to-Network Relay role with respect to 5 UEs for PDN#1.

In this case, the relay UE compares/evaluates/checks the reference information or threshold information value and a current information/updated information/latest information value. As a result, since the current information/updated information/latest information value is equal to the reference information value (i.e., the two values are both 5), the relay UE may stop an operation of informing other UEs of relay function related information thereof described in operation 2-1) or may not provide the relay function related information thereof to other UEs any longer. Alternatively, in the case of PDNs (e.g., PDN#2 and PDN#3) to which the relay UE provides the relay function, if the number of UEs does not reach a maximum number of UEs for which the relay UE is capable of performing the ProSe UE-to-Network Relay role, the relay UE may continue to perform an operation of informing other UEs of the relay function related information with respect to PDN#2 and PDN#3 and may stop an operation of informing other UEs of the relay function related information only with respect to PDN#1.

The operation of comparing/evaluating/checking the reference information or threshold information maintained/managed in relation to load control/relay control/threshold control/capacity control described in operation 1-1) with the current information/updated information/latest information described in operation 1-2) may be performed in a typically understood form such as a sequential form, a repeated nested form, and/or a combined form, suitable for the range and meaning of the maintained/managed information. This may be applied to all embodiments of the present invention.

2-3) An operation of a UE capable of acting as a relay (a ProSe UE-to-Network Relay and/or a ProSe UE-to-UE Relay) (i.e., a relay UE) when a UE for which the relay UE performs relaying (i.e., a relayed UE) is deleted or when there is no necessity to provide a relay function to the relayed UE will now be described.

The relay UE compares/evaluates/checks the reference information (or threshold information) maintained/managed in relation to load control/relay control/threshold control/capacity control described in operation 1-1) and the current information/updated information/latest information maintained or managed in operation 1-2). As a result of comparison/evaluation/check, if the current information/updated information/latest information i) is decreased/lower than, ii) does not exceed, or iii) is expected not to exceed the reference information (or threshold information), the relay UE resumes an operation of informing other UEs of relay function related information thereof described in operation 2-1) or provides the relay function related information thereof to other UEs.

Alternatively, as a result of comparison/evaluation/check, if part of the current information/updated information/latest information i) is decreased/lower than, ii) does not exceed, or iii) is expected not to exceed the reference information (or threshold information), the relay UE may provide, to other UEs, information containing/including information related to the part of the current information/updated information/latest information (i.e., information which i) is decreased/lower than, ii) does not exceed, or iii) is expected not to exceed the reference information (or threshold information)) among the relay function related information thereof described in operation 2-1).

As an example (hereinafter, example 2-3-a), as a result of example 2-2-a), it may be assumed that the relay UE stops the operation of informing other UEs of the relay function related information thereof described in operation 2-1) or that the relay UE does not provide the relay function related information to other UEs any longer. Next, if it is determined that there is no need to provide a relay function to one of UEs to which the ProSe UE-to-Network Relay function has been provided, the relay UE compares/evaluates/checks a reference information or threshold information value in relation to a maximum number of UEs for which the relay UE is capable of acting as the ProSe UE-to-Network Relay and a current information/updated information/latest information value.

Whether there is no need to provide a relay function to one of UEs to which the ProSe UE-to-Network Relay function has been provided may be determined according to explicit information or implicit information. Alternatively, such determination may be made according to information received from a UE to which the relay function does not need not be provided or a network or may be internally or locally made by the relay UE.

As a result, since the current information/updated information/latest information value is less than the reference information value (i.e., 4<5), the relay UE may resume an operation of informing other UEs of the relay function related information thereof described in operation 2-1) or provide the relay function related information to other UEs.

As another example (hereinafter, example 2-3-b), as a result of example 2-2-b), it may be assumed that the relay UE stops an operation of informing other UEs of the relay function related information thereof described in operation 2-1) or that the relay UE does not provide the relay function related information to other UEs any longer. Next, if it is determined that there is no need to provide a relay function to one of UEs of group#1 to which the ProSe UE-to-Network Relay function has been provided, the relay UE compares/evaluates/checks the reference information or threshold information value and the current information/updated information/latest information value, in relation to a maximum number of UEs to which the relay UE is capable of providing the ProSe UE-to-Network Relay role for group#1. As a result, since the current information/updated information/latest information value is less than the reference information value (i.e., 4<5), the relay UE may resume an operation of informing other UEs of the relay function related information thereof described in operation 2-1) (or provide the relay function related information thereof to other UEs).

As a result of example 2-2-b), in the case of other groups (e.g., group#2 and group#3) to which the relay UE provides the relay function, the number of UEs does not reach a maximum number of UEs for which the relay UE is capable of performing the ProSe UE-to-Network Relay role. Therefore, if the relay UE continues to perform an operation of informing other UEs of the relay function related information with respect to group#2 and group#3 and stops an operation of informing other UEs of the relay function related information only with respect to group#1, the relay UE may perform an operation of informing other UEs of the relay function related information by including/adding the relay function related information for group#1.

As still another example (hereinafter, example 2-3-c), as a result of example 2-2-3), it may be assumed that that the relay UE stops an operation of informing other UEs of the relay function related information described in operation 2-1) or does not provide the relay function related information thereof to other UEs any longer. In this case, if it is determined that there is no need to provide a relay function to one of UEs for PDN#1 to which the ProSe UE-to-Network Relay function has been provided, the relay UE compares/evaluates/checks the reference information or threshold information value and the current information/updated information/latest information value, in relation to a maximum number of UEs for PDN#1 to which the ProSe UE-to-Network Relay role can be provided.

As a result, the current information/updated information/latest information value is less than the reference information value (i.e., 4<5) and the relay UE resumes an operation of informing other UEs of the relay function related information thereof described in operation 2-1) (or provides the relay function related information to other UEs).

As a result of example 2-2-c), in the case of other groups (e.g., PDN#2 and PDN#3) to which the relay UE provides the relay function, the number of UEs does not reach a maximum number of UEs for which the relay UE is capable of performing the ProSe UE-to-Network Relay role. Therefore, if the relay UE continues to perform an operation of informing other UEs of the relay function related information with respect to PDN#2 and PDN#3 and stops an operation of informing other UEs of the relay function related information only with respect to PDN#1, the relay UE may additionally perform the operation of informing other UEs of the relay function related information by including/adding the relay function related information for PDN#1.

3. Operation of Determining New Relay Request of Relay UE

According to the present invention, a UE capable of acting as a relay (a ProSe UE-to-Network Relay and/or a ProSe UE-to-UE Relay) may perform an operation for determining whether to accept, reject, or ignore a new relay request. The new relay request may be a request received from a new UE to which relaying is not currently provided or may be a request received from an existing UE to which relaying has been provided (e.g., while the relay UE is providing relaying to group#1, the relay UE is requested to provide additional relay to group#2).

Upon receiving the request, the UE capable of serving as a relay (a ProSe UE-to-Network Relay and/or a ProSe UE-to-UE Relay) compares/evaluates/checks the reference information or threshold information maintained/managed in relation to load control/relay control/threshold control/capacity control described in operation 1-1) to see if it is satisfied even when the requested relay function is additionally provided based on a current state. Information necessary for comparison/evaluation/check may be various information necessary to provide the requested new relay and include, for example, information as to whether a UE-to-Network Relay function should be provided, information as to whether a UE-to-UE Relay function should be provided, identity information of a group, MBMS service information, TMGI information, and radio frequency information.

Further, a UE receiving the relay request may contain the information necessary for comparison/evaluation/check and the information may be obtained from a UE making the relay request and/or a network node. For example, the UE receiving the relay request may obtain the information necessary for comparison/evaluation/check by transmitting the information in at least one of a process in which the UE making the relay request discovers a relay UE, a process of making the relay request, or a process of registering a UE in a network for group communication or may be acquired from a network node (e.g., a GCSE AS). In addition, a user service description (USD) may be used as the information (or part of the information).

As a result of the comparison/evaluation/check, if the reference information (or threshold information) is satisfactory even if the requested relay is additionally provided (i.e., if the result value does not exceed or is equal to the reference information), it is determined that the relay request is permitted. Unlike this, when the request relay is additionally provided, if the reference information (or threshold information) is not satisfied (i.e., the result value exceeds reference information), the relay request is determined to be rejected or ignored.

If the relay request is determined to be permitted, the UE receiving the relay request may explicitly or implicitly transmit a message indicating that the relay request has been permitted to the UE making the relay request. Conversely, if it is determined that the relay request has been rejected, the UE receiving the relay request may explicitly or implicitly transmit a message indicating that the relay request has been rejected to the UE making the relay request.

For example, it is assumed that a relay UE receiving a new relay request should compare/evaluate/check a maximum number of radio frequencies for receiving an MBMS capable of performing a ProSe UE-to-Network Relay role, among the information of 1-1-6) of operation 1-1). It is also assumed that a maximum number of radio frequencies for receiving the ProSe UE-to-Network Relay role is 1. In this case, the relay UE receiving the new relay request should provide the ProSe UE-to-Network Relay function. If a radio frequency for this function is different from a radio frequency on which the relay UE is currently performing the ProSe UE-to-Network Relay role, the relay UE may determine that the new relay request is rejected or ignored.

As another example, it is assumed that a relay UE should compare/evaluate/check a maximum number of TMGIs capable of performing a ProSe UE-to-Network Relay role, among the information of 1-1-5) of operation 1-1). It is also assumed that a maximum number of radio frequencies capable of performing a ProSe UE-to-Network Relay role is 3. In this case, in a situation in which the number of TMGIs to which the relay UE is capable of performing the ProSe UE-to-Network Relay function is 3, if the relay UE should relay another new TMGI other than the 3 TMGIs due to a relay request, the relay UE determines that the (additional) relay request is rejected or ignored. However, if the relay request under such a situation is for one of TMGIs to which the relay UE is providing a relaying function, the relay UE may determine that the relay request is permitted. If the number of TMGIs to which the relay UE performs the ProSe UE-to-Network Relay function is 2 and if the relay UE should relay another new TMGI other than the two TMGIs due to the relay request, the relay UE determines that the relay request is permitted because a maximum number of TMGIs to which the relay UE is capable of performing the ProSe-UE-to-Network Relay function is 3.

According to the present invention, an operation in which a UE capable of acting as a relay (a ProSe UE-to-Network Relay and/or a ProSe UE-to-UE Relay) accepts a new relay request may be interpreted as an operation in which the UE capable of performing the relay role allocates/provides an IP address or an IPv6 prefix to a UE making a relay request. In addition, an operation in which the UE capable of acting as a relay (a ProSe UE-to-Network Relay and/or a ProSe UE-to-UE Relay) rejects or ignores the new relay request may be interpreted as an operation in which the UE capable of performing the relay role does not allocate/provide the IP address or IPv6 prefix to the UE making a relay request. In this way, the relay request may be interpreted as an operation for requesting that the IP address or the IPv6 prefix be allocated/provided.

In addition, the UE capable of acting as a relay (a ProSe UE-to-Network Relay and/or a ProSe UE-to-UE Relay) may dynamically apply load control/relay control/threshold control/capacity control based on one or more of information of a) to c) described below.

a) Information related to a reception (or incoming) pattern of traffic that the relay UE should relay to UE(s) receiving relaying: For example, upon receiving incoming traffic that the relay UE should provide relaying in large amount (or busty) at the same time/almost similar time/short time, the relay UE may determine use/application of the load control/relay control/threshold control/capacity control method. Such a determination may be made only once at a time when the relay UE receives incoming traffic or plural determinations may be made in some cases.

b) Information related to a source IP address of traffic that the relay UE should relay to UE(s) receiving relaying: For example, among incoming traffic that the relay UE should relay (traffic received by the relay UE), if the number of cases in which UEs receiving relaying are different (i.e., destination IP addresses are different) but source IP addresses are equal is greater than a predetermined number, the relay UE may determine use/application of the load control/relay control/threshold control/capacity control method.

c) Information related to a destination IP address of traffic that the relay UE should provide relaying, received from UE(s) receiving relaying: For example, among traffic that the UEs receiving relaying transmit to the relay UE (i.e., traffic that the relay UE should relaying), if the number of cases in which traffic is received from UEs receiving different relaying (i.e., source IP addresses are different) but destination IP addresses are equal is greater than a predetermined number, the relay UE may determine use/application of the load control/relay control/threshold control/capacity control method.

The present invention may be applied to all of ProSe one-to-one communication, ProSe group communication, and ProSe broadcast communication. In addition, the present invention may also be applied to group communication that is being discussed in Group Communication System Enablers for LTE (GCSE_LTE) of 3GPP Rel-12.

The present invention is not limited only to an LTE/EPC network. The present invention may be applied to all UMTS/EPS mobile communication systems including a 3GPP access network (e.g., UTRAN/GERAN/E-UTRAN) and a non-3GPP access network (e.g., WLAN). The present invention may be applied to all wireless communication system environments to which control of the other networks is applied.

4. Embodiments of the Present Invention 4-1. ProSe UE-to-Network Relay

A ProSe UE-to-Network Relay according to a first embodiment of the present invention will now be described.

Figure 5:
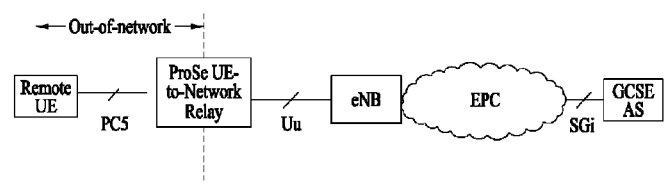
FIG. 5 is a diagram referred to for explaining a path through which a remote UE is connected to a network via a ProSe UE-to-Network Relay.

As illustrated in FIG. 5, the ProSe UE-to-Network Relay provides a connection point for a unicast service to public safety UEs that are not served by an E-UTRAN.

The ProSe UE-to-Network Relay needs to relay unicast traffic in UL and DL between a UE connected to the relay and a network. Therefore, the relay should relay any type of traffic that is relevant to public safety communication. For reference, in the LTE standard document 3GPP TS 23.303, MBMS traffic relaying from a Uu interface to PC5 (a reference point between UEs for control and a user plane for discovery and communication, in relation to ProSe) is not supported. Therefore, optimized one-to-one direct communication with the ProSe UE-to-Network Relay has the following characteristics:

Communication with ProSe UE-to-Network Relays is connectionless.

ProSe direct discovery following model A or model B may be used in order to allow a remote UE (i.e., a UE desired to receive relaying) to select a ProSe UE-to-Network Relay.

ProSe direct discovery may be used in order to allow the remote UE to discover a ProSe UE ID of the ProSe UE-to-Network Relay.

ProSe direct discovery may be used in order to allow the remote UE to discover a layer-2 (L2) link layer address of the ProSe UE-to-Network Relay to be used by the remote UE for IP address allocation signaling and user plane traffic corresponding to a specific PDN connection supported by the ProSe UE-to-Network Relay.

ProSe bearers are bi-directional. IP packets passed to the radio layer on a given radio bearer will be transmitted by a physical layer with an associated L2 destination address. Packets passed up from the radio layer on the same radio bearer will be received to the same L2 destination.

The ProSe UE-to-Network Relay includes the following functions:

The ProSe UE-to-Network Relay acts as an "announcing" or "discoveree" UE on PC5 performing direct discovery.

The ProSe UE-to-Network Relay may not act as an "announcing" or "discoveree" UE if a configured threshold for ProSe UE-to-Network Relay functionality (e.g., the number of the remote UEs that the ProSe UE-to-Network Relay serves) has been reached.

The ProSe UE-to-Network Relay acts as a default router to the remote UE forwarding IP packets between a remote UE-ProSe UE-to-Network Relay point-to-point link and a corresponding PDN connection.

The ProSe UE-to-Network Relay controls Router Solicitation and Router Advertisement messages as defined in RFC 4861.

The ProSe UE-to-Network Relay acts as DHCPv4 and DHCPv6 proxy or server. Procedures for ProSe UE-to-Network Relay using DHCPv4 and HDCPv6 are under discussion.

The ProSe UE-to-Network Relay acts as a NAT if IPv4 is used to replace a locally assigned IPv4 address of the remote UE with its own.

The ProSe UE-to-Network Relay maps an L2 link ID used by the remote UE as a destination L2 ID to the corresponding PDN connection supported by the UE-to-Network Relay UE.

4-2. Direct Communication Via ProSe UE-to-Network Relay: Using IPv6 Address

Figure 6:
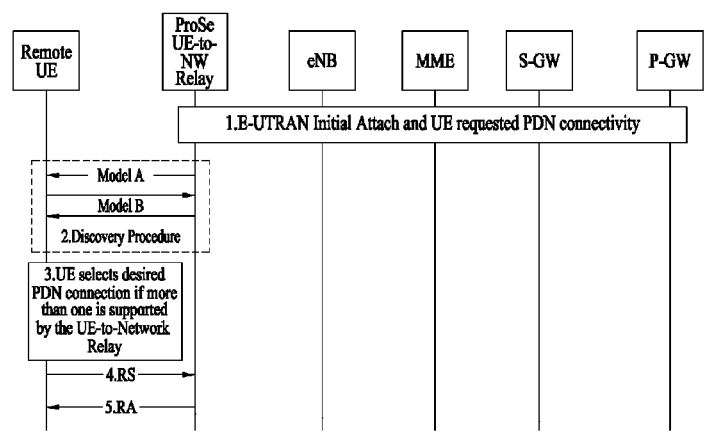
FIG. 6 is a diagram referred to for explaining the case in which the present invention is applied to direct communication via a ProSe UE-to-Network Relay.

FIG. 6 is a diagram referred to for explaining the case in which the present invention is applied to direct communication via a ProSe UE-to-Network Relay. A method for a remote UE (i.e., a UE that desires to receive relaying) to perform IPv6 stateless address auto-configuration via a relay UE will now be described with reference to FIG. 6.

In step 1 of FIG. 6, a ProSe UE-to-Network Relay attaches to a network and obtains an IPv6 prefix from the network. It may optionally establish an additional number of PDN connections.

In step 2 of FIG. 2, the ProSe UE-to-Network Relay may provide information assisting the remote UE to perform "relay selection" (e.g., if one or more relays perform announcing in proximity) according to model A or model B. The ProSe UE-to-Network Relay may also indicate whether it supports the ability to receive signalling from the remote UE.

The ProSe UE-to-Network Relay may not act as an "announcing UE" or a "discoveree UE" if a configured threshold for ProSe UE-to-Network Relay functionality (e.g., the number of remote UEs receiving a ProSe UE-to-Network Relay service) has been reached. Information about the threshold (i.e., threshold information) may be a maximum number of remote UEs that the ProSe UE-to-Network Relay can serve or the number of remote UEs that the ProSe UE-to-Network Relay can serve per PDN established for a connection to an EPC (i.e., in association with a corresponding PDN). Further, control plane signalling between the remote UE and the ProSe UE-to-Network Relay may be needed in order to establish a security association between the remote UE and the ProSe UE-to-Network Relay.

In step 3 of FIG. 6, the remote UE uses received relay selection information to select a UE-to-Network Relay and a PDN that the remote UE desires to connect.

In step 4 of FIG. 6, if a PDN type associated with a PDN connection is IPv4v6 or IPv6 and the remote UE is configured to perform IPv6 stateless address auto-configuration, the remote UE sends a Router Solicitation message to a network using an L2 link ID of a relay corresponding to the PDN connection selected by the remote UE, in order to solicit a Router Advertisement message. The message is sent from a destination L2 to a ProSe UE ID of the ProSe UE-to-Network Relay discovered in step 2 of FIG. 6.

In step 5 of FIG. 6, upon receiving the Route Solicitation message from the UE, the ProSe UE-to-Network Relay sends an IPv6 Router Advertisement message as specified in IETF RFC 4862 to the UE having PDN connection type IPv4v6 or IPv6 (i.e. the ProSe UE-to-Network Relay acts as an advertising interface as specified in IETF RFC 4861 for the PDN connection type IPv4v6 or IPv6). The Router Advertisement message contains the IPv6 prefix assigned during establishment of the PDN connection selected by the remote UE. After receiving the Router Advertisement message, the remote UE constructs a full IPv6 address via IPv6 stateless address auto-configuration in accordance with IETF RFC 4862.

However, the remote UE should not use any identifiers defined in TS 23.003 as the basis for generating an interface identifier. For privacy, the remote UE may change the interface identifier used to generate the full IPv6 address (as defined in TS 23.221 without involving the network). The remote UE uses the auto-configured IPv6 address while sending packets in this implicitly created PDN connection.

4-3. Direct Communication Via ProSe UE-to-Network Relay: Using IPv4 Address

Figure 7:
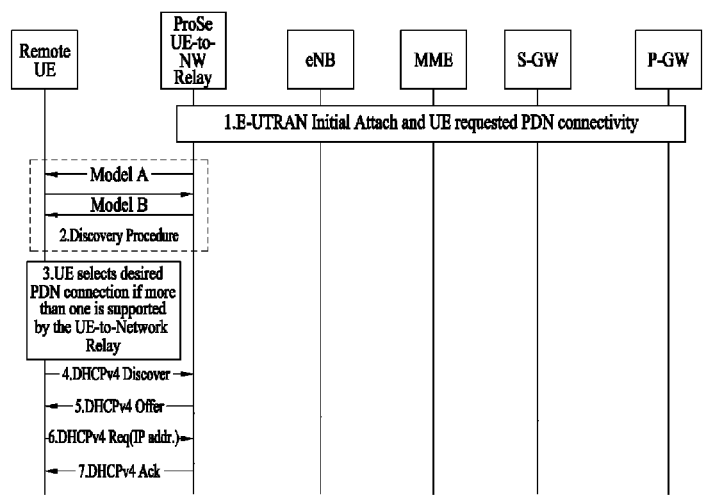
FIG. 7 is a diagram referred to for explaining another case in which the present invention is applied to direct communication via a ProSe UE-to-Network Relay.

FIG. 7 is a diagram referred to for explaining the case in which the present invention is applied to direct communication via a ProSe UE-to-Network Relay.

Steps 1 to 3 of FIG. 7 are identical to steps 1 to 3 of FIG. 6 and, therefore, a description thereof will be omitted.

In step 4 of FIG. 7, if a PDN type associated with a PDN connection is IPv4v6 or IPv4 and a remote UE is configured to perform DHCPv4, the remote UE sends DHCPv4 Discovery message. The message is sent from a destination L2 address to a ProSe UE ID of the ProSe UE-to-Network Relay discovered in step 2 of FIG. 7.

In step 5 of FIG. 7, the ProSe UE-to-Network Relay acting as a DHCPv4 server sends an assigned IPv4 address of the remote UE corresponding to the PDN connection selected by the remote UE together with a DHCPv4 Offer message.

In step 6 of FIG. 7, upon receiving the DHCPv4 Offer message, the remote UE sends a DHCP REQUEST message containing the received IPv4 address.

In step 7 of FIG. 7, the ProSe UE-to-Network Relay acting as the DHCPv4 server sends a DHCPACK packet to the remote UE. This message includes a lease duration and any other configuration information (that a client might have requested). Upon receiving the DHCPACK message, the remote UE completes a TCP/IP configuration process.

In the above-described process, the DHCPv4 client may skip a DHCPv4 discovery phase and broadcast the DHCPv4 REQUEST message upon transmitting the first message.

Figure 8:
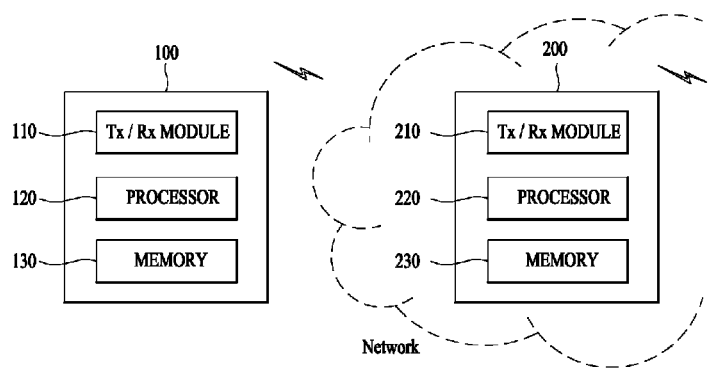
FIG. 8 is a diagram illustrating the construction of a UE and a network node according to an embodiment of the present invention.

FIG. 8 is a diagram illustrating the construction of a UE and a network node according to an embodiment of the present invention.

Referring to FIG. 8, a UE 100 according to the present invention may include a transmission (Tx)/reception (Rx) module 110, a processor 120, and a memory 130. The Tx/Rx module 110 may be configured to transmit various signals, data, and information to an external device and to receive various signals, data, and information from the external device. The UE 100 may be connected to the external device by wire and/or wirelessly. The processor 120 may be configured to control overall operation of the UE 110 and to perform a function of operationally processing information that the UE 100 is to transmit and receive to and from the external device. The memory 130 may store the operationally processed information for a predetermined time and may be replaced with a component such as a buffer (not shown).

The UE 100 according to an embodiment of the present invention may be configured to participate in a ProSe according to a result of determining whether a ProSe initiated by a network can be provided or a result of discovering a ProSe UE. The processor 120 of the UE 100 may be configured to transmit ProSe based information to a network node 200, using the Tx/Rx module 110. The processor 120 may be configured to receive information indicating whether a ProSe is permitted, from the network node 200 using the Tx/Rx module 110. The processor 120 may be configured to process signaling for performing direct data path setup with other UEs. The processor 120 may be configured to perform direct communication with other UEs, using the Tx/Rx module 110. The processor 120 may be configured to transmit information related to a result of performing a ProSe to the network node 200 using the Tx/Rx module 110.

Referring to FIG. 8, the network node 200 according to the present invention may include a Tx/Rx module 210, a processor 220, and a memory 230. The Tx/Rx module 210 may be configured to transmit various signals, data, and information to an external device and to receive various signals, data, and information from the external device. The network node 200 may be connected to the external device by wire and/or wirelessly. The processor 220 may be configured to control overall operation of the network node 210 and to perform a function of operationally processing information that the network node 200 is to transmit and receive to and from the external device. The memory 130 may store the operationally processed information for a predetermined time and may be replaced with a component such as a buffer (not shown).

The network node 200 according to an embodiment of the present invention may be configured to support a ProSe between a plurality of UEs. The processor 120 of the network node 200 may be configured to receive ProSe based information from the UE 100 or another node, using the Tx/Rx module 210. The processor 220 may be configured to transmit information indicating whether a ProSe is permitted, to the UE 100 using the Tx/Rx module 210. The processor 120 may be configured to process signaling for performing direct data path setup with other UEs. The processor 120 may be configured to assist the UE 100 in performing direct communication with other UEs. The processor 220 may be configured to receive information related to a result of performing a ProSe from the network node 200 using the Tx/Rx module 210.

The detailed configurations of the UE 100 and the network node 200 may be implemented such that the various embodiments of the present invention are independently performed or two or more embodiments of the present invention are simultaneously performed. Redundant matters will not be described herein for clarity.

The above-described embodiments may be implemented by various means, for example, by hardware, firmware, software, or a combination thereof.

In a hardware configuration, the method according to the embodiments of the present invention may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, or microprocessors.

In a firmware or software configuration, the method according to the embodiments of the present invention may be implemented in the form of modules, procedures, functions, etc. performing the above-described functions or operations. Software code may be stored in a memory unit and executed by a processor. The memory unit may be located at the interior or exterior of the processor and may transmit and receive data to and from the processor via various known means.

The detailed description of the exemplary embodiments of the present invention is given to enable those skilled in the art to realize and implement the present invention. While the present invention has been described referring to the exemplary embodiments of the present invention, those skilled in the art will appreciate that many modifications and changes can be made to the present invention without departing from the scope of the present invention. For example, the constructions of the above-described embodiments of the present invention may be used in combination. Therefore, the present invention is not intended to be limited to the embodiments disclosed herein but is to give a broadest range matching the principles and new features disclosed herein.

The present invention may be embodied in other specific forms than those set forth herein without departing from the spirit and essential characteristics of the present invention. The above description is therefore to be construed in all aspects as illustrative and not restrictive. The scope of the invention should be determined by reasonable interpretation of the appended claims and all changes coming within the equivalency range of the invention are intended to be within the scope of the invention. The present invention is not intended to limit the embodiments disclosed herein but is to give a broadest range matching the principles and new features disclosed herein. In addition, claims that are not explicitly cited in each other in the appended claims may be presented in combination as an embodiment of the present invention or included as a new claim by subsequent amendment after the application is filed.

INDUSTRIAL APPLICABILITY

The embodiments of the present invention can be applied to a variety of mobile communication systems.

The invention claimed is:

1. A method for performing relay control by a relay User Equipment (UE) capable of acting as a relay in a wireless communication system, the method comprising:
announcing, by the relay UE, information about whether the relay UE is capable of performing relaying;
receiving, by the relay UE, a new relay request from a remote UE;
updating, by the relay UE, state information of the relay UE with the new relay request; and
performing relay control, by the relay UE, based on comparing the updated state information with reference information,
wherein the reference information comprises threshold information for relay connection, and is set to be changed based on the state information of the relay UE, and
wherein the reference information is set to be decreased by a maximum value of the reference information when the relay UE meets a predetermined condition.

2. The method according to claim 1,
wherein the reference information includes at least one of a maximum number of relayed UEs, a maximum number of relayed groups, a maximum amount of relayed traffic, a maximum number of the PDN connections, a maximum number of relayed Multimedia Broadcast Multicast Services (MBMSs), a maximum number of relayed radio frequencies, and a maximum number of relayed MBMS over a Single Frequency Network (MBSFN) areas.

3. The method according to claim 1,
wherein the state information of the relay UE includes the number of at least one group for which the relay UE performs relaying, and
wherein the predetermined condition includes a case when the number of the at least one group is greater than a preset value.

4. The method according to claim 3,
wherein, if the at least one group uses the same Packet Data Network (PDN) connection, the number of relayed UEs associated with each of the at least one group is set to be decreased, and
wherein, if the at least one group uses different PDN connections, the number of relayed UEs associated with each of the at least one group is set to not be decreased.

5. The method according to claim 1,
wherein the state information of the relay UE includes the number of media of group communication for which the relay UE performs relaying, and
wherein the predetermined condition includes a case when the number of the media of group communication is greater than a preset value.

6. The method according to claim 1,
wherein the state information of the relay UE includes types of media of group communication for which the relay UE performs relaying, and
wherein the predetermined condition includes a case when a preset media type is included in the types of the media of group communication.

7. The method according to claim 1,
wherein the state information of the relay UE includes a remaining battery amount of the relay UE, and
wherein the predetermined condition includes a case when the battery amount is greater than a preset value.

8. The method according to claim 1,
wherein the reference information is set to be periodically changed.

9. The method according to claim 1,
wherein the relay request is an IP address or IPv6 prefix allocation request.

10. A relay User Equipment (UE) capable of acting as a relay for performing relay control in a wireless communication system, the relay UE comprising:
a radiofrequency (RF) unit; and
a processor that:
controls the RF unit to announce information about whether the relay UE is capable of performing relaying;
controls the RF unit to receive a new relay request from a remote UE;
updates state information of the relay UE with the new relay request; and
performs relay control by comparing the updated state information with reference information,
wherein the reference information comprises threshold information for relay connection, and is set to be changed based on the state information of the relay UE, and wherein the reference information is set to be decreased by a maximum value of the reference information when the relay UE meets a predetermined condition.

* * * * *